(12) United States Patent
Nishida et al.

(10) Patent No.: US 6,852,798 B1
(45) Date of Patent: Feb. 8, 2005

(54) POLYCARBONATE-BASED THERMOPLASTIC RESIN COMPOSITION AND PROCESS FOR PRODUCING THE SAME

(75) Inventors: Kozi Nishida, Otake (JP); Atsunori Koshirai, Otake (JP); Nobuhisa Takayama, Otake (JP)

(73) Assignee: Mistubishi Rayon Co., Ltd., Tokyo (JP)

( * ) Notice: Subject to any disclaimer, the term of this patent is extended or adjusted under 35 U.S.C. 154(b) by 63 days.

(21) Appl. No.: 10/344,007

(22) PCT Filed: Aug. 14, 2000

(86) PCT No.: PCT/JP00/05440

§ 371 (c)(1),
(2), (4) Date: Feb. 13, 2003

(87) PCT Pub. No.: WO02/14428

PCT Pub. Date: Feb. 21, 2002

(51) Int. Cl.$^7$ .............................................. C08L 69/00
(52) U.S. Cl. ......................................... 525/67; 525/148
(58) Field of Search .................................... 525/67, 148

(56) References Cited

U.S. PATENT DOCUMENTS

| | | | |
|---|---|---|---|
| 4,831,082 A | 5/1989 | Peascoe ....................... | 525/148 |
| 5,187,227 A | 2/1993 | Tera et al. .................... | 525/65 |

FOREIGN PATENT DOCUMENTS

| | | |
|---|---|---|
| EP | 335365 | 3/1989 |
| EP | 0 465 792 | 1/1992 |
| EP | 510548 | 4/1992 |
| EP | 1010725 | 6/2000 |
| JP | 56-143239 | 11/1981 |
| JP | 62-138514 | 6/1987 |
| JP | 1-268761 | 10/1989 |
| JP | 4-065461 | 3/1992 |
| JP | 5-140435 | 6/1993 |
| JP | 6-322224 | 11/1994 |
| JP | 11-181197 | 7/1999 |
| JP | 2000-169659 | 6/2000 |
| WO | 00/04094 | 1/2000 |
| WO | WO 00/20504 | 4/2000 |

*Primary Examiner*—David J. Buttner
(74) *Attorney, Agent, or Firm*—Oblon, Spivak, McClelland, Maier & Neustadt, P.C.

(57) ABSTRACT

A polycarbonate-based thermoplastic resin composition is characterized by comprising a polycarbonate and a substantially gel-free polymer obtained by polymerizing an aromatic vinyl monomer in the presence of a polymer obtained by polymerizing a specific alkyl (meth)acrylate, an aromatic vinyl monomer, and a monomer having two or more unsaturated groups. The composition has excellent moldability (flowability, etc.) while having the intact mechanical properties (impact strength, etc.) inherent in the polycarbonate and has an excellent balance between moldability and mechanical properties. Due to the excellent balance, the composition enables size increase and thickness reduction in molded articles in various fields, especially in the field of domestic electrical appliances and housings for OA apparatuses. The composition is of great industrial value.

9 Claims, No Drawings

POLYCARBONATE-BASED THERMOPLASTIC RESIN COMPOSITION AND PROCESS FOR PRODUCING THE SAME

TECHNICAL FIELD

The present invention relates to a polycarbonate thermoplastic resin composition which is superior in fluidity and impact strength.

BACKGROUND ART

Polycarbonates are used in various fields such as housing materials of appliances and office automation appliances because of excellent mechanical properties such as impact strength.

However, polycarbonates have drawbacks such as low fluidity and poor processability.

To improve the fluidity, the molecular weight of the polycarbonates themselves may be decreased. However, when the molecular weight of a polycarbonate is decreased, the impact strength is lowered. In general, a styrene-butadiene-acrylonitrile copolymer is mixed to improve the fluidity, however, a large amount of the copolymer must be mixed to obtain effective fluidity and as a result, the impact strength is lowered.

For the purpose of improving the balance between the fluidity and the impact strength of polycarbonates, an experiment of adding various vinyl polymers was carried out. This experiment is roughly divided into a trial of improving the fluidity of high-molecular weight polycarbonates having high impact strength and low fluidity and a trial of improving the impact strength of low-molecular weight polycarbonates having high fluidity and low impact strength.

For example, Japanese Unexamined Patent Application, First Publication No. Sho 56-143239, Japanese Unexamined Patent Application, First Publication No. Hei 1-65461, and Japanese Unexamined Patent Application, First Publication No. Hei 1-268761 describe that the impact strength of polycarbonates is improved by adding a polymer containing an alkyl acrylate rubber.

However, the resin composition thus obtained has insufficient fluidity and insufficient impact strength.

Also Japanese Unexamined Patent Application, First Publication No. Sho 62-138514 describes that the fluidity of polycarbonates is improved by adding a polymer comprising an aromatic vinyl monomer and methyl methacrylate.

However, the resin composition thus obtained has low impact strength.

Japanese Unexamined Patent Application, First Publication No. Hei 5-140435 describes that the fluidity of polycarbonates is improved by adding a low molecular weight polymer comprising an aromatic vinyl monomer and all alkyl acrylate.

However, since this low-molecular weight polymer contains a large amount of soft components, the polymer is sticky and has poor handling properties, such that blocking is likely to occur. Moreover, when test pieces have a large thickness, the impact strength is lowered.

Japanese Unexamined Patent Application, First Publication No. Hei 1-268761 describes that the addition of a high-molecular weight alkyl methacrylate polymer is effective to prevent sagging of polycarbonates during extrusion molding.

However, the addition is not effective to improve the fluidity.

Japanese Unexamined Patent Application, First Publication No. Hei 11-181197 describes that polycarbonates are superior in fluidity, heat resistance, transparency, and odors/fumes when a low-molecular weight aromatic vinyl polymer having a solubility parameter of more than 9.3 and less than 11.5 is added.

However, the resin composition thus obtained has low impact resistance.

As described above, although an experiment of adding various vinyl polymers has been carried out in the prior art, no experiment has ever succeeded in improving the balance between the fluidity and the impact strength of polycarbonates.

DISCLOSURE OF INVENTION

The present invention has been made to solve the above problems and the object thereof is to improve processability (for example, fluidity) without impairing the excellent mechanical characteristics (for example, impact strength) unique to polycarbonates, and to provide a polycarbonate thermoplastic resin composition having an excellent balance between both characteristics.

The present inventors have intensively studied to achieve the above object and found it very effective to add a specific polymer obtained by two-stage polymerization to polycarbonates, and thus the present invention has been completed.

The polycarbonate thermoplastic resin composition of the present invention comprises: a polymer (A), which contains substantially no gel, obtained by polymerizing an aromatic vinyl monomer (a-4) in the presence of a polymer obtained by polymerizing 15 to 100% by weight of an alkyl (meth)acrylate (a-1) whose an alkyl group has 2 to 20 carbon atoms, 85 to 0% by weight of an aromatic vinyl monomer (a-2), and a monomer (a-3) having two or more unsaturated groups and a polycarbonate (B).

The alkyl (meth)acrylate (a-1) is preferably at least one monomer selected from the group consisting of ethyl (meth)acrylate, butyl (meth)acrylate and 2-ethylhexyl (meth)acrylate.

The weight-average molecular weight of the polymer of (a-1). (a-2), and (a-3) is preferably 300,000 or less.

The method for manufacturing the polycarbonate thermoplastic resin composition comprises:

a first-stage polymerization step of polymerizing 15 to 100% by weight of an alkyl (meth)acrylate (a-1) whose alkyl group has 2 to 20 carbon atoms, 85 to 0% by weight of an aromatic vinyl monomer (a-2), and a monomer (a-3) having two or more unsaturated groups, a second-stage polymerization step of polymerizing an aromatic vinyl monomer (a-4) in the presence of the polymer obtained in the first-stage polymerization step, and a mixing step of mixing the polymer (A) obtained in the second-stage polymerization step with a polycarbonate (B).

In the present invention, "(meth)acrylate" means "at least acrylate or methacrylate".

BEST MODE FOR CARRYING OUT THE INVENTION

The polymer (A) used in the present invention is obtained by two-stage polymerization. In the first-stage polymerization, an alkyl (meth)acrylate (a-1) an aromatic vinyl monomer (a-2), and a monomer (a-3) having two or mole unsaturated groups are polymerized.

In the second-stage polymerization, an aromatic vinyl monomer (a-4) is polymerized in the presence of the polymer obtained in the first-stage polymerization.

The alkyl (meth)acrylate (a-1) used in the present invention has an alkyl group having 2 to 20 carbon atoms. The alkyl group may has either a straight chain or a branched chain. Specific examples of the alkyl (meth)acrylate include ethyl (meth)acrylate, butyl (meth)acrylate, 2-methylbutyl (meth)acrylate, 3-methylbutyl (meth)acrylate, hexyl (meth)acrylate, heptyl (meth)acrylate, octyl (meth)acrylate, 2-ethylhexyl (meth)acrylate, decyl (meth)acrylate, lauryl, (meth)acrylate, tridecyl (meth)acrylate, cetyl (meth) acrylate, stearyl (meth)acrylate, and eicosyl (meth)acrylate. These alkyl (meth)acrylates can be used alone, or two or more kinds of them can be used in combination.

Taking account of the fluidity and cost of the resin composition, ethyl (meth)acrylate, butyl (meth)acrylate, 2-ethylhexyl (meth)acrylate lauryl (meth)acrylate, tridecyl (meth)acrylate, and stearyl (meth)acrylate are preferred. Among these, ethyl (meth)acrylate, butyl (meth)acrylate, and 2-ethylhexyl (meth)acrylate are more preferred.

Specific examples of the aromatic vinyl monomer (a-2) used in the present invention include styrene, α-methylstyrene, p-methylstyrene, α-methyl-p-methylstyrene, p-methoxystyrene, o-methoxystyrene, 2,4-dimethylstyrene, chlorostyrene, and bromostyrene. These aromatic vinyl monomers can be used along, or two or more kinds of them can be used in combination. Taking account of the fluidity and cost of the resin composition, styrene, α-methylstyrene, and chlorostyrene are preferred.

Although the aromatic vinyl monomer (a-2) is not necessarily essential, the appearance of the molded article can be improved by using the aromatic vinyl monomer.

Specific examples of the monomer having two or more unsaturated groups (a-3) used in the present invention include allyl (meth)acrylate, triallyl cyanurate, triallyl isocyanurate, ethylene glycol di(meth)acrylate, propylene glycol di(meth)acrylate. 1,3-butylene glycol di(meth) acrylate, and 1,4-butylene glycol di(meth)acrylate. Taking account of the fluidity of the resin composition, monomers having two or more unsaturated groups with different reactivities for example, allyl (meth)acrylate, triallyl cyanurate, and triallyl isocyanurate are preferred. Triallyl cyanurate and triallyl isocyanurate have three allyl groups. The reactivity of the allyl group which is reacted first is different from that of the allyl groups which are reacted second and third.

In the case of polymerizing the monomers (a-1) (a-2) and (a-3), one, or two or more kinds of copolymerizable compounds such as: α-olefin such as ethylene or propylene; an ester of vinyl alcohol such as vinyl acetate; a compound having an epoxy group such as vinyl glycidyl ether or allyl glycidyl ether; a dicarboxylic anhydride such as maleic anhydride; a vinyl monomer having a functional group such as an amino group, hydroxyl group, mercapto group carboxylic acid group, carboxylic anhydride, dicarboxylic acid, halogen group, or halogenated carbonyl; and (meth)acrylic acid or methyl (meth)acrylate can be used in combination in the amount of 50% by weight or less based on the total polymerization component.

The aromatic vinyl monomer (a-4) of the present invention may be the same as that of the monomer (a-2).

In the case of polymerizing the monomer (a-4), one, or two or more kinds of copolymerizable compounds such as: alkyl (meth)acrylate such as (meth)acrylic acid, methyl (meth)acrylate, ethyl (meth)acrylate, butyl (meth)acrylate, 2-ethylhexyl (meth)acrylate, lauryl (meth)acrylate, tridecyl (meth)acrylate, or stearyl (meth)acrylate; α-olefin such as ethylene or propylene; an ester of vinyl alcohol such as vinyl acetate; a compound having an epoxy group, such as glycidyl (meth)acrylate, vinyl glycidyl ether, or allyl glycidyl ether; a dicarboxylic anhydride such as maleic anhydride; and a vinyl monomer having a functional group such as an amino group, hydroxyl group, mercapto group, carboxylic acid group, carboxylic anhydride, dicarboxylic acid, halogen group, or halogenated carbonyl can be used in combination in the amount of 50% by weight or less based on the total polymerization component.

In the first-stage polymerization, the proportion of the alkyl (meth)acrylate (a-1) is from 15 to 100% by weight and the proportion of the aromatic vinyl monomer (a-2) is from 85 to 0% by weight. Taking account of the impact strength of the resin composition, the proportion of the alkyl (meth) acrylate (a-1) is preferably from 25 to 100% by weight and the proportion of the aromatic vinyl monomer (a-2) is preferably from 75 to 0% by weight. Taking account of the appearance of the molded resin composition, the proportion of the alkyl (meth)acrylate (a-1) is more preferably from 25 to 95% by weight and the proportion of the aromatic vinyl monomer (a-2) is more preferably front 75 to 5% by weight; the proportion of the alkyl (meth)acrylate (a-1) is most preferably, from 25 to 85% by weight and the proportion of the aromatic vinyl monomer (a-2) is most preferably from 75 to 15% by weight.

The polymer (A) contains substantially no gel. As used herein, gel refers to a polymer or polymer particles having a three-dimensional network. To confirm that the polymer (A) does not contain a gel, for example, the following means is used. It can be said that the polymer (A) contains substantially no gel if there exists a liquid which dissolves the polymer (A).

In the first-stage polymerization, the amount of the monomer having two or more unsaturated groups (a-3) is within a range where the polymer (A) contains substantially no gel, and is preferably from 0.001 to 10 parts by weight based on 100 parts by weight of the total amount of the monomers (a-1) and (a-2). Although the addition of the monomer (a-3) improves the appearance of the molded resin composition, when the amount of the monomer is too large or the reactivity is too high, a gel is formed in the polymer and the fluidity of the resin composition is lowered. The use of a chain transfer agent in the first-stage polymerization is preferred because it suppresses the formation of a gel, and the amount is preferably from 0.001 to 10 parts by weight.

The proportion of the polymer of the first stage and the proportion of the aromatic vinyl monomer (a-4) in the second-stage polymerization may be appropriately set, if necessary, and is not specifically limited in the present invention. Based on the amount of the respective monomers, the total amount of the monomers (a-1) and (a-2) is preferably from 1 to 90% by weight and the amount of the monomer (a-4) is preferably from 99 to 10% by weight while the total amount of the monomers (a-1) and (a-2) is more preferably from 5 to 60% by weight and the amount of the monomer (a-4) is more preferably from 95 to 40% by weight. When the proportion of the aromatic vinyl monomer (a-4) is appropriately increased, the stickiness of the polymer (A) is suppressed, and thus blocking can be satisfactorily prevented and handling properties can be improved. When the proportion of the aromatic vinyl monomer (a-4) is appropriately decreased, the impact strength of the resin composition is more improved.

After the completion of the first-stage polymerization, the weight-average molecular weight of the polymer is preferably from 3,000 to 300,000 and more preferably from 3,000 to 50,000, taking account of the processability of the resin composition. After the completion of the second-stage polymerization, the weight-average molecular weight of the polymer (A) is preferably from 3,000 to 1,000,000 and more preferably from 3,000 to 600,000.

The molecular structure of the polymer (A) is not specifically limited as long as the polymer contains substantially no gel. The polymer may have a straight-chain, comb, branched, star-shaped, or cascade-shaped molecular structure.

The two-stage polymerization method for obtaining the polymer (A) is not specifically limited and various conventionally known polymerization methods can be used such as radical polymerization, anion polymerization, and cation polymerization in a bulk, solution, emulsion, or suspension system. In the polymerization, various conventionally known polymerization additives can be used such as polymerization initiators, polymerization catalysts, chain transfer agents, molecular weight modifiers, organic solvents, dispersion mediums, emulsifiers, and dispersants.

Examples of the polymerization initiator of the radical polymerization include peroxide such as tert-butyl hydroperoxide or cumene hydroperoxide; azo initiator such as azobisisobutyronitrile; and redox initiator using an oxidizing agent and a reducing agent in combination. Specific examples of the redox initiator include sulfoxylate initiators using ferrous sulfate, disodium ethylenediamine tetraacetate, rongalite, and hydroperoxide in combination.

Examples of the emulsifier include a nonionic emulsifier, anionic emulsifier, cationic emulsifier, and amphoteric ion emulsifier. Specific examples of the nonionic emulsifier include polyoxyethylene alkyl ether, polyoxyethylene alkyl allyl ether, dialkylphenoxypoly(ethyleneoxy)ethanol, polyvinyl alcohol, polyacrylic acid, and alkylcellulose. Specific examples of the anionic emulsifier include fatty acid salts, higher alcohol sulfate silts, liquid fatty oil sulfate salts, sulfates of aliphatic amine and aliphatic amide, fatty alcohol phosphate salts, sulfonates of dibasic fatty acid esters, fatty acid amide sulfonates, alkylallyl sulfonates, and naphthalenesulfonates of formalin condensate. Specific examples of the cationic emulsifier include aliphatic amine salts, quaternary ammonium salts, and alkyl pyridinium salts. A specific example of the amphoteric ion emulsifier includes alkylbetaine.

Examples of the chain transfer agent include n-octylmercaptan and tert-dodecylmercaptan.

When the first-stage polymerization is conducted by emulsion radical polymerization, a polymerization catalyst is optionally added to a mixture of water, an emulsifier, the alkyl (meth)acrylate (a-1), the aromatic vinyl monomer (a-2), the monomer having two or more unsaturated groups (a-3), a polymerization initiator, and a chain transfer agent, and the mixture is polymerized at a high temperature. When the aromatic vinyl monomer (a-4) is supplied in the polymerization system after the completion of emulsion radical polymerization and after the first-stage polymerization is conducted, the polymer (A) can be obtained.

In the first-stage polymerization and second-stage polymerization, the method of supplying the respective monomers is not specifically limited and the monomers may be supplied at one time or supplied in several portions.

According to this emulsion polymerization, a latex of the polymer (A) is obtained and the polymer (A) is isolated and recovered by pouring the latex into an aqueous solution of a coagulating agent. As the coagulating agent, for example, metal salts such as calcium chloride, calcium acetate, and aluminum sulfate, and sulfuric acid can be used.

The polymer (A) may be used alone, or two or more kinds of them may be used in combination.

Typical examples of the polycarbonate (B) used in the present invention include 4,4'-dioxydiarylalkane polycarbonate such as 4,4'-dihydroxydiphenyl-2,2-propane (i.e. bisphenol A) polycarbonate. The molecular weight of the polycarbonate may be appropriately set, if necessary, and is not specifically limited in the present invention. The weight-average molecular weight of the polycarbonate (B) is preferably from 20,000 to 100,000, and more preferably 40,000 to 70,000.

The polycarbonate (B) may be prepared by various conventionally known methods. For example, 4,4'-dihydroxydiphenyl-2,2-propane polycarbonate is prepared by a method of using 4,4'-dihydroxydiphenyl-2,2-propane as a raw material and reacting while blowing phosgene in the presence of an aqueous alkali solution and a solvent, and a method of transesterifying 4,4'-dihydroxydiphenyl-2,2-propane with a carbonate diester in the presence of a catalyst.

The thermoplastic resin composition of the present invention is a composition containing the polymer (A) and the polycarbonate (B) described above as a main component. The proportion of both may be appropriately decided according to desired physical properties and is not specifically limited in the present invention. To impart a sufficient effect of improving the fluidity to the polycarbonate resin composition without deteriorating performance (for example, impact strength) of the polycarbonate itself, the amount of the polymer (A) is preferably within a range from 0.01 to 20 parts by weight and the amount of the polycarbonate (B) is preferably within a range from 99.99 to 80 parts by weight; the amount of the polymer (A) is more preferably within a range from 0.01 to 10 parts by weight and the amount of the polycarbonate (B) is more preferably within a range from 99.99 to 90 parts by weight, based on 100 parts by weight of the total of the polymer (A) and the polycarbonate (B).

If necessary, various conventionally known additives, stabilizers, reinforcers, inorganic fillers, and impact resistance modifiers may be further added to the thermoplastic resin composition of the present invention.

After preparing a masterbatch by mixing the polymer (A) with the polycarbonate (B) at an increased proportion of the polymer (A), a desired composition can be prepared by mixing the masterbatch with the polycarbonate (B).

The thermoplastic resin composition of the present invention can be obtained, for example, by mixing the respective components described above. As the mixing method, various conventionally known mixing and kneading methods can be used. Examples thereof include methods using a Henschel mixer, Banbury mixer, single screw extruder, twin-screw extruder, twin roll, kneader, and Brabender.

Various molded articles having an excellent balance between the fluidity and the impact strength can be obtained by molding the thermoplastic resin composition of the present invention thus obtained as the raw material using various conventionally known molding methods such as injection molding, hollow molding, extrusion molding, compression molding, and calendering.

Concrete values of the physical properties of the thermoplastic resin composition of the present invention may be appropriately controlled, if necessary, and are not specifically limited in the present invention. With respect to the fluidity, a melt viscosity as measured under the measuring conditions of the Examples described hereinafter is preferably 2,000 poise or less. With respect to the impact strength, an Izod impact strength as measured under the measuring conditions (ASTM D256) of the Examples described hereinafter is preferably 500 J/m or more. It is considered that a thermoplastic resin composition having these physical properties has an excellent balance between the fluidity and the impact strength.

EXAMPLES

The Examples of the present invention will be described below.

Various physical properties in the Examples and Comparative Examples were determined by the following procedures.

(1) Solid content

The polymerized latex was dried at 170° C. for 30 minutes and the weight was measured, and then the solid content was determined.

(2) Weight-average molecular weight (Mw)

The weight-average molecular weight was determined by gel permeation chromatography (GPC) (chloroform as an eluent, polymethyl acrylate standard).

(3) Melt viscosity

The melt viscosity of the resin composition vas measured by a capillary type rheometer (manufactured by Toyo Seiki Seisaku-sho, Ltd., tinder the trade name of Capirograph) under the conditions of a nozzle D=1 mm, L/D=10, a barrel temperature of 250° C., and a shear rate of 6.080 sec$^{-1}$.

(4) Izod impact strength (Izd.)

In accordance with ASTM D256, the Izod impact strength was measured under the conditions of a thickness of a specimen with a notch of 3.2 mm, a temperature of 23° C., and a humidity of 50% RH. The specimen was molded under the conditions of a cylinder temperature of 270° C. and a mold temperature of 80° C. using an injection molding machine (IS-100, manufactured by TOSHIBA MACHINE CO., LTD.).

(5) Appearance of molded resin composition

A specimen having a size of 100×100×3 mm was molded under the conditions of a cylinder temperature of 270° C. and a mold temperature of 80° C. using an injection molding machine (IS-100, manufactured by TOSHIBA MACHINE CO., LTD.). The resulting specimen vas visually observed. As a result, a specimen for which laminar peeling was observed was rated "good", while a specimen for which laminar peeling was observed only at the gate portion was rated "slightly poor".

<Preparation Example 1: Preparation of polymer (A-I)>

In a separable flask equipped wraith a cooling tube and a stirrer, 1.0 parts by weight of sodium dodecylbenzenesulfonate and 188 parts by weight of distilled water were charged and then heated to 60° C. in a water bath under a nitrogen atmosphere. A solution prepared by dissolving 0.0004 parts by weight of ferrous sulfate, 0.0012 parts by weight of disodium ethylenediamine tetraacetate and 0.48 parts by weight of rongalite in 6 parts by weight of distilled water was added, and then a mixture of 10 parts by weight of butyl acrylate, 10 parts by weight of styrene, 0.2 parts by weight of allyl methacrylate, 0.2 parts by weight of n-octylmercaptan, and 0.1 parts by weight of cumene hydroperoxide was added dropwise over 40 minutes. After stirring for 60 minutes, the first-stage polymerization was completed. A small amount of the emulsion thus obtained was collected and a weight-average molecular weight (Mw) of the first-stage polymer was measured. The weight-average molecular weight was 30,000.

In this emulsion, a solution prepared by dissolving 0.0004 parts by weight of ferrous sulfate, 0.0012 parts by weight of disodium ethylenediamine tetraacetate, and 0.48 parts by weight of rongalite in 6 parts by weight of distilled water was added, and then a mixture of 80 parts by weight of styrene, 0.8 parts by weight of n-octylmercaptan, and 0.4 parts by weight of cumene hydroperoxide was added dropwise over 140 minutes. After stirring for 60 minutes, the second-stage polymerization was completed. The solid content of the emulsion thus obtained was measured. The solid content was 32%.

The emulsion was poured into an aqueous calcium chloride solution and the resulting precipitate was dried to obtain a polymer (A-I). The weight-average molecular weight was 30,000.

<Preparation Example 2: Preparation of polymer (A-II)>

The same operation was conducted as in Preparation example 1, except that the compositions of the first and second stages were changed as shown in Table 1, and a polymer (A-II) was obtained. The solid content was 33%, the weight-average molecular weight was 30,000 after the first-stage polymerization, and the weight-average molecular weight was 30,000 after the second-stage polymerization.

<Preparation Example 3: Preparation of polymer (A-III)>

The same operation was conducted as in Preparation Example 1, except that the compositions of the first and second stages were changed as shown in Table 1, and a polymer (A-III) was obtained. The solid content was 33%, the weight-average molecular weight was 30,000 after the first-stage polymerization, and the weight-average molecular weight was 30,000 after the second-stage polymerization.

<Preparation Example 4: Preparation of polymer (A-IV)>

The same operation was conducted as in Preparation Example 1, except that the compositions of the first and second stages were changed as shown in Table 1, and a polymer (A-IV) was obtained. The solid content was 32%, the weight-average molecular weight was 30,000 after the first-stage polymerization, and the weight-average molecular weight was 30,000 after the second-stage polymerization.

<Preparation Example 5: Preparation of polymer (A-V)>

The same operation was conducted as in Preparation Example 1, except that the compositions of the first and second stages were changed as shown in Table 1, and a polymer (A-V) was obtained. The solid content was 33%, the weight-average molecular weight was 30,000 after the first-stage polymerization, and the weight-average molecular weight was 30,000 after the second-stage polymerization.

<Preparation Example 6: Preparation of polymer (A-VI)>

In a separable flask equipped with a cooling tube and a stirrer, 1.0 parts by weight of sodium dodecylbenzenesulfonate and 194 parts by weight of distilled water were charged and then heated to 60° C. in a water bath under a nitrogen atmosphere. A solution prepared by dissolving 0.0008 parts by weight of ferrous sulfate, 0.0024 parts by weight of disodium ethylenediamine tetraacetate, and 0.96 parts by weight of rongalite in 6 parts by weight of distilled water was added, and then a mixture of 100 parts by weight of styrene, 1.0 parts by weight of n-octylmercaptan, and 0.5 parts by weight of cumene hydroperoxide was added dropwise over 180 minutes. After stirring for 60 minutes, the polymerization was completed. The solid content of the emulsion thus obtained was measured. The solid content was 32%.

The emulsion was poured into an aqueous calcium chloride solution and the resulting precipitate was dried to obtain a polymer (A-VI). The weight-average molecular weight was 30,000.

<Preparation Example 7: Preparation of polymer (A-VII)>
The same operation was conducted as in Preparation Example 6, except that the composition was changed as shown in Table 2, and a polymer (A-VII) was obtained. The solid content was 32% and the weight-average molecular weight was 30,000.

<Preparation Example 8: Preparation of polymer (A-VIII)>
The same operation was conducted as in Preparation Example 6, except that the composition was changed as shown in Table 2, and a polymer (A-VIII) was obtained. The solid content was 32% and the weight-average molecular weight was 30,000. The polymer (A-VIII) was sticky and was likely to be blocked.

<Preparation Example 9: Preparation of polymer (A-IX)>
The same operation was conducted as in Preparation Example 6, except that the compositions of the first and second stages were changed as shown in Table 2, and a polymer (A-IX) was obtained. The solid content was 32%, the weight-average molecular weight was 30,000 after the first-stage polymerization, and the weight-average molecular weight was 30,000 after the second-stage polymerization.

<Preparation Example 10: Preparation of polymer (A-X)>
The same operation was conducted as in Preparation Example 6 except that the compositions of the first and second stages were changed as shown in Table 3, and a polymer (A-X) was obtained. The solid content was 33%. After the first-stage polymerization and second-stage polymerization, the polymers were in the form of a gel insoluble in chloroform and it was impossible to measure the molecular weight.

<Preparation Example 11: Preparation of polymer (A-XI)>
The same operation was conducted as in Preparation Example 6, except that the compositions of the first and second stages were changed as shown in Table 3, and a polymer (A-XI) was obtained. The solid content was 32%. After the first-stage polymerization and second-stage polymerization, the polymers were in the form of a gel insoluble in chloroform and it was impossible to measure the molecular weight.

<Preparation Example 12: Preparation of polymer (A-XII)>
The same operation was conducted as in Preparation Example 6, except that the compositions of the first and second stages were changed as shown in Table 3, and a polymer (A-XII) was obtained. The solid content was 32%, the weight-average molecular weight was 30,000 after the first-stage polymerization, and the weight-average molecular weight was 30,000 after the second-stage polymerization.

<Preparation Example 13: Preparation of polymer (A-XIII)>
The same operation was conducted as in Preparation Example 6, except that the compositions of the first and second stages were changed as shown in Table 3, and a polymer (A-XIII) was obtained. The solid content was 33%, the weight-average molecular weight was 30,000 after the first-stage polymerization, and the weight-average molecular weight was 30,000 after the second-stage polymerization.

<Examples 1 to 5 and Comparative Examples 1 to 9>
Polycarbonate ("S2000", manufactured by Mitsubishi Engineering-Plastics Corporation, weight-average molecular weight: about 50,000) and the polymers (A-I) to (A-XIII) obtained in Preparation Examples 1 to 13 were mixed in the ratios shown in Table 1 to Table 3, and then the mixtures were extruded under the conditions of a barrel temperature of 270° C. and a screw speed of 200rpm using a 30 mmφ twin-screw extruder ("ZSK30", manufactured by WERNER & PFLEIDERER) to prepare thermoplastic resin compositions. The melt viscosity, the impact strength, and the appearance of the molded resulting thermoplastic resin compositions were evaluated. The results are shown in Table 1 to Table 3.

TABLE 1

|  | Examples | | | | |
|---|---|---|---|---|---|
|  | 1 | 2 | 3 | 4 | 5 |
| Abbreviations of (A) | A-I | A-II | A-III | A-IV | A-V |
| First stage | | | | | |
| BA | 10 | 10 | 13 | — | 20 |
| EHMA | — | — | — | 10 | — |
| St | 10 | 10 | 7 | 10 | — |
| AMA | 0.2 | 0.4 | 0.4 | 0.2 | 0.2 |
| OcSH | 0.2 | 0.4 | 0.4 | 0.2 | 0.2 |
| Weight-average molecular weight (Mw) | | | 30,000 | | |
| Second stage | | | | | |
| St | | | 80 | | |
| OcSH | 0.8 | 1.6 | 1.6 | 0.8 | 0.8 |
| Weight-average molecular weight (Mw) | | | 30,000 | | |
| Amount of (A) (parts by weight) | | | 5 | | |
| Amount of (B) PC (parts by weight) | | | 95 | | |
| Melt viscosity (poise) | 1,800 | 1,700 | 1,400 | 1,800 | 1,900 |
| Izod impact strength (J/m) | 600 | 510 | 640 | 580 | 600 |
| Appearance | good | good | good | good | slightly poor |

TABLE 2

|  | Comparative Examples | | | | |
|---|---|---|---|---|---|
|  | 1 | 2 | 3 | 4 | 5 |
| Abbreviation of (A) | — | A-VI | A-VII | A-VIII | A-IX |
| First stage | | | | | |
| BA | — | — | 10 | 30 | — |
| St | — | 100 | 90 | 70 | 20 |
| MMA | — | — | — | — | — |
| AMA | — | — | — | — | 0.2 |
| EDMA | — | — | — | — | — |
| OcSH | — | 1.0 | 1.0 | 1.0 | 0.2 |
| Weight-average molecular weight (Mw) | | | 30,000 | | |
| Second stage | | | | | |
| St | — | — | — | — | 80 |
| OcSH | — | — | — | — | 0.8 |
| Weight-average molecular weight (Mw) | — | — | — | — | 30,000 |
| Amount of (A) (parts by weight) | — | 5 | 5 | 5 | 5 |
| Amount of (B) PC (parts by weight) | 100 | 95 | 95 | 95 | 95 |
| Melt viscosity (poise) | 3,600 | 1,100 | 900 | 690 | 1,300 |
| Izod impact strength (J/m) | 110 | 130 | 140 | 190 | 120 |
| Appearance | good | good | good | laminar peeling | good |

TABLE 3

|  | Comparative Examples | | | |
|---|---|---|---|---|
|  | 6 | 7 | 8 | 9 |
| Abbreviation of (A) | A-X | A-XI | A-XII | A-XIII |
| First stage |  |  |  |  |
| BA | 10 | 10 | 10 | — |
| St | 10 | 10 | — | 10 |
| MMA | — | — | 10 | 10 |
| AMA | 0.2 | 0.2 | — | 0.2 |
| EDMA | 0.2 | — | — | — |
| OcSH | — | — | 0.2 | 0.2 |
| Weight-average molecular weight (Mw) | impossible to measure | | 30,000 | |
| Second stage |  |  |  |  |
| St | 80 | 80 | 80 | 80 |
| OcSH | 0.8 | 0.8 | 0.8 | 0.8 |
| Weight-average molecular weight (Mw) | impossible to measure | | 30,000 | |
| Amount of (A) (parts by weight) | 5 | | | |
| Amount of (B) PC (parts by weight) | 95 | | | |
| Melt viscosity (poise) | 3,500 | 3,500 | 1,000 | 1,300 |
| Izod impact strength (J/m) | 100 | 590 | 520 | 110 |
| Appearance | good | good | laminar peeling | good |

Abbreviations in tables
BA: butyl acrylate
EHMA: 2-ethylhexyl methacrylate
St: styrene
MMA: methyl methacrylate
AMA: allyl methacrylate
EDMA: ethylene glycol dimethacrylate
OcSH: n-octylmercaptan
PC: polycarbonate <Evaluation>

As is apparent from the results shown in Table 1, in Examples 1 to 5, the, melt viscosity was 2,000 poise or less and the Izod impact strength was 500 J/m or more, and therefore the balance between the fluidity and the impact strength was excellent. To sufficiently prevent poor appearance of the molded resin compositions, it was effective to use a polymer (A) containing an aromatic vinyl monomer (a-2) and a monomer having two or more unsaturated groups (a-3).

In Comparative Example 1, since the polymer (A) was not used and on a polycarbonate (B) was used, the fluidity was poor. In Comparative examples 2 to 4, since a polymer (A-VI) (A-VII), or (A-VIII) obtained by the one-stage polymerization of an alkyl (meth)acrylate and an aromatic vinyl monomer was used, the resin compositions were inferior in impact strength. In Comparative Example 4, the resin composition was inferior in appearance of the molded resin composition and the handling properties of the polymer (A-VIII) itself. In Comparative Example 5, since a polymer (A-IX) containing no alkyl (meth)acrylate (a-1) was used, the resin composition was inferior in impact strength. In Comparative Examples 6 and 7, since a polymer (A-X) or (A-XI) of a crosslinked gel was used, the resin compositions were inferior in fluidity. In Comparative Example 8, since a polymer (A-XII) containing no monomer (a-3) having two or more unsaturated groups was used, the resin composition was inferior in appearance of the molded resin composition. In Comparative Example 9, since a polymer (A-XIII) containing methyl acrylate, an alkyl group of which had few carbon atoms (one), was used in place of the alkyl (meth)acrylate) late (a-1) the resin composition was inferior in impact strength.

INDUSTRIAL APPLICABILITY

As described above, according to the present invention, it is possible to improve processability (for example, fluidity) without impairing the excellent mechanical characteristics (for example, impact strength) of polycarbonates itself and to provide a polycarbonate thermoplastic resin composition having an excellent balance between both characteristics.

Since the thermoplastic resin composition of the present invention is superior in balance between mechanical characteristics and processability, it is possible to realize large-sized and thin molded articles in various fields such as housings of appliances and office automation appliances. Therefore, its industrial value is great.

The present invention may be embodied in other specific forms without departing from the spirit or essential characteristics thereof. The present embodiment is therefore to be considered in all respects as illustrative and not restrictive, the scope of the present invention being indicated by the appended claims rather than by the foregoing description and all changes which come within the meaning and range of equivalency of the claims are therefore intended to be embraced therein.

What is claimed is:

1. A thermoplastic resin composition comprising:
   a polymer (A), which is substantially a gel-free polymer, obtained by polymerizing an aromatic vinyl monomer (a-4) in the presence of a polymer obtained by polymerizing 15 to 100% by weight of an alkyl (meth) acrylate (a-1) whose alkyl group has 2 to 20 carbon atoms, 85 to 0% by weight of an aromatic vinyl monomer (a-2), and a monomer (a-3) having two or more unsaturated groups in the presence of a chain transfer agent; and
   a polycarbonate (B).

2. The thermoplastic resin composition according to claim 1, wherein the alkyl (meth)acrylate (a-1) is at least one monomer selected from the group consisting of ethyl (meth) acrylate, butyl (meth)acrylate, and 2-ethylhexyl (meth) acrylate.

3. The thermoplastic resin composition according to claim 1, wherein a weight-average molecular weight of the polymer obtained by polymerizing 15 to 100% by weight of an alkyl (meth)acrylate (a-1) whose alkyl group has 2 to 20 carbon atoms, 85 to 0% by weight of an aromatic vinyl monomer (a-2), and a monomer (a-3) having two or more unsaturated groups is from 3,000 to 300,000.

4. The thermoplastic resin composition according to claim 1, wherein the aromatic vinyl monomer (a-2) is styrene.

5. The thermoplastic resin composition according to claim 1, wherein the polymer (A) is soluble in chloroform.

6. A method for manufacturing a polycarbonate thermoplastic resin composition, comprising:
   a first-stage polymerization step of polymerizing 15 to 100% by weight of an alkyl (meth)acrylate (a-1) whose alkyl group has 2 to 20 carbon atoms, 85 to 0% by weight of an aromatic vinyl monomer (a-2), and a monomer (a-3) having two or more unsaturated groups in the presence of a chain transfer agent;
   a second-stage polymerization step of polymerizing an aromatic vinyl monomer (a-4) in the presence of the polymer obtained in the first-stage polymerization step; and
   a mixing step of mixing the polymer (A) obtained in the second-stage polymerization step with a polycarbonate (B).

7. A method for manufacturing a polycarbonate thermoplastic resin composition according to claim 6, wherein the alkyl (meth)acrylate (a-1) is at least one monomer selected from the group consisting of ethyl (meth)acrylate, butyl (meth)acrylate, and 2-ethylhexyl (meth)acrylate.

8. A method for manufacturing a polycarbonate thermoplastic resin composition according to claim 6, wherein a weight-average molecular weight of the polymer obtained by polymerizing 15 to 100% by weight of an alkyl (meth)acrylate (a-1) whose alkyl group has 2 to 20 carbon atoms, 85 to 0% by weight of an aromatic vinyl monomer (a-2), and a monomer (a-3) having two or more unsaturated groups is from 3,000 to 300,000.

9. A method for manufacturing a polycarbonate thermoplastic resin composition according to claim 6, wherein the aromatic vinyl monomer (a-2) is styrene.

* * * * *